United States Patent
Burgess et al.

(10) Patent No.: US 12,158,933 B2
(45) Date of Patent: Dec. 3, 2024

(54) APPARATUS AND METHODS FOR CONTENT-BASED BIOMETRIC AUTHENTICATION

(71) Applicant: Bank of America Corporation, Charlotte, NC (US)

(72) Inventors: Patrick Burgess, Stockholm (SE); Trish Gillis, Chicago, IL (US); Taylor Farris, Hoboken, NJ (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 600 days.

(21) Appl. No.: 17/389,500

(22) Filed: Jul. 30, 2021

(65) Prior Publication Data
US 2023/0032328 A1    Feb. 2, 2023

(51) Int. Cl.
*G06F 21/32*    (2013.01)
*G06N 20/00*    (2019.01)
*H04L 9/32*    (2006.01)

(52) U.S. Cl.
CPC ............. *G06F 21/32* (2013.01); *G06N 20/00* (2019.01); *H04L 9/3247* (2013.01)

(58) Field of Classification Search
CPC ....... G06F 21/32; G06N 20/00; H04L 9/3247; H04L 63/0861; H04L 63/205; H04L 2209/56; H04L 9/3231; H04W 12/06; H04W 12/37; H04W 12/60
See application file for complete search history.

(56) References Cited

U.S. PATENT DOCUMENTS

| | | | |
|---|---|---|---|
| 9,160,536 B2 | 10/2015 | Joyce, III | |
| 9,503,894 B2 | 11/2016 | Shanmugam et al. | |
| 9,531,710 B2* | 12/2016 | Deutschmann | H04L 63/0884 |
| 9,578,022 B2 | 2/2017 | Salonen | |
| 9,674,700 B2 | 6/2017 | John Archibald et al. | |
| 9,832,023 B2 | 11/2017 | Joyce, III | |
| 10,440,019 B2* | 10/2019 | Deutschmann | H04W 12/065 |
| 10,608,823 B2 | 3/2020 | Mandal et al. | |
| 2003/0012374 A1* | 1/2003 | Wu | H04L 9/3247 |
| | | | 713/176 |
| 2005/0261562 A1* | 11/2005 | Zhou | A61B 5/14865 |
| | | | 600/347 |
| 2006/0047963 A1* | 3/2006 | Brown | H04L 9/3231 |
| | | | 713/176 |
| 2008/0095425 A1* | 4/2008 | Franklin | H04N 1/32144 |
| | | | 382/137 |
| 2009/0235082 A1* | 9/2009 | Garrett | H04L 9/3231 |
| | | | 713/176 |

(Continued)

FOREIGN PATENT DOCUMENTS

CN    113688360 A * 11/2021 ............. G06F 21/16

*Primary Examiner* — Khalid M Almaghayreh
(74) *Attorney, Agent, or Firm* — Weiss & Arons LLP

(57) ABSTRACT

Apparatus and methods for content- and context-based biometric authentication are provided. The apparatus and methods may include using multiple biometric sensors and an authentication engine that decides which sensor(s) to use through a content- and/or context-based analysis. The apparatus and methods may include requesting authentication, analyzing the request to determine which sensor(s) is appropriate, prompting a user to use the sensor(s) and comparing the data received with data stored in a database to provide authentication.

5 Claims, 5 Drawing Sheets

(56) References Cited

U.S. PATENT DOCUMENTS

| | | | |
|---|---|---|---|
| 2010/0332838 A1* | 12/2010 | Zhu | H04L 9/3231 |
| | | | 713/176 |
| 2015/0186634 A1* | 7/2015 | Crandell | H04L 9/3231 |
| | | | 713/186 |
| 2015/0347734 A1* | 12/2015 | Beigi | H04L 9/3268 |
| | | | 726/28 |
| 2016/0171339 A1* | 6/2016 | Choi | G06F 18/256 |
| | | | 382/103 |
| 2016/0313801 A1* | 10/2016 | Wagner | G06F 1/163 |
| 2017/0230363 A1* | 8/2017 | Deutschmann | H04W 12/065 |
| 2017/0286748 A1* | 10/2017 | Kim | G06V 40/1382 |
| 2020/0366671 A1* | 11/2020 | Larson | G06F 9/451 |

* cited by examiner

APPARATUS AND METHODS FOR CONTENT-BASED BIOMETRIC AUTHENTICATION

FIELD OF TECHNOLOGY

Aspects of the disclosure relate to providing apparatus and methods for content-based biometric authentication, and the possible use of multiple biometric sensors.

BACKGROUND OF THE DISCLOSURE

As more and more business and financial transactions are effectuated and discussed online or through computers, risks also increase. Malicious actors are becoming more sophisticated as online transactions increase. Further, it is becoming more common for online transactions to occur where neither party meets face-to-face or in-person.

As online transactions increase, securing and authenticating the transactions is becoming more important. Standard security and authentication, such as passwords, including one-time passwords, may be insufficient, or may become insufficient as the skills of malicious actors increase.

Biometric authentication methods may be more secure than standard security and authentication methods. For example, fingerprints, retinal scans, facial scans, body scans, gait, typing speed, typing style, gestures and other unique biometric markers may be unique to each individual and harder to simulate or imitate.

In some contexts, multiple biometric authentication methods may be better than a single biometric authenticator or one or more standard security and authentication methods. In some contexts, multiple signatures or authenticators may be required on a single document. Replacing each signature or authenticator with the same or a different biometric authenticator may increase security and the level of authentication. It may be easier to forge a signature or fake an electronic signature than it would be to fake a biometric authenticator.

In other contexts, combining standard security and authentication methods with biometrics may increase security and authentication. However, it may be important to decide when and where to require one or more biometric authenticators, and which type of available biometric authentication. These decisions may be made by analyzing, through artificial intelligence/machine learning or other methods, the context of when and where the security and authentication is needed, as well as the content of what the security and authentication is needed for.

Therefore, it would be desirable for apparatus and methods for content-based biometric authentication and multiple biometrics.

SUMMARY OF THE DISCLOSURE

It is an object of this disclosure to provide apparatus and methods for content- and context-based biometric authentication, including through the use of multiple biometric sensors.

An apparatus for increasing authentication and security using multiple biometrics is provided. The apparatus may include two or more biometric sensors. Each biometric sensor included with the apparatus may measure one or more biometric attributes/indicia of a user. For example, one sensor may measure a fingerprint, while another sensor may measure the user's face for facial recognition. In an embodiment, each sensor may measure the same biometric attribute(s) of the user. In another embodiment, each sensor may measure different biometric attribute(s) of the user.

In an embodiment, one sensor may measure multiple biometric attributes of a user. For example, a camera may be able to perform a facial recognition scan as well as measure a user's gait and other bodily features (e.g., hand size measurements, body size measurements) unique to an individual. These, and other attributes, may be referred to as biometric attributes in this disclosure.

The apparatus may include one or more analog to digital signal converters that may convert analog signals (i.e., analog versions of biometric attributes) measured by each biometric sensor to computer-readable digital data. In an embodiment, a biometric sensor may measure digital data or convert, within the sensor itself, analog data to digital data.

The apparatus may include one or more computer processors and non-transitory memory electronically coupled to the processor(s). The memory may include an operating system that runs on/through the processor(s). The memory may also include an authentication engine/program/module that runs on/through the processor(s), as well as other data. The other data may include previously stored biometric attributes of the user for comparison with measured biometric attributes. In an embodiment, the previously stored biometric attributes of the user may be stored in a location remote from the apparatus, such as on a central or distributed server.

In an embodiment, the apparatus may include a communication circuit or link to communicate with a remote server or database or the Internet.

The authentication engine may be arranged/designed to receive a request to authenticate the user. The request may come from a separate program, another user, a website, or any other appropriate location. The authentication program may activate one of or all of the biometric sensors on the apparatus.

In an embodiment, the request for authentication may be to authenticate a document, and may include the contents of the document. In another embodiment, the request may be to allow access to a separate program, or a physical location. In another embodiment, the request for authentication may be to authenticate a request for an action, such as a withdrawal or transfer of money from one bank account to another.

The authentication engine may determine, through analysis of the context and content of the request, which one of the biometric sensors would be appropriate to use to authenticate the user. In an embodiment, the engine may determine that two or more biometric sensors may be appropriate to authenticate the user. In an embodiment, the authentication engine may utilize artificial intelligence/machine learning algorithm(s) ("AI/ML") to make its determination(s).

Once the engine has determined which one or more biometric sensors would be appropriate to respond to the received request, it may prompt the user to use the determined sensor(s) to measure one or more biometric attributes of the user. The engine may then use the chosen sensor(s) to measure the corresponding biometric attributes of the user. If necessary, the engine may use the analog to digital signal converters to convert the measurements to digital data. The authentication engine may store the digital data in non-transitory memory. The authentication engine may compare the measured biometric attributes to previously stored biometric attribute(s) in order to authenticate the user. The previously stored biometric attributes may be stored on the apparatus or may be stored in a location remote from the apparatus. If the measured biometric attributes match the stored biometric attributes, the engine may authenticate the user. If they do not match, the engine may deny authentication.

In various embodiments, a biometric sensor may be a fingerprint scanner, a signature scanner, a palm print scanner, a microphone, an iris/retinal scanner, a camera that measure various body parts including for facial recognition and gait recognition, a DNA scanner, vital signs monitor, keyboard sensors, gesture recognition scanners, artery/vein scanners, or other types of biometric sensors.

In an embodiment, the apparatus may be a mobile device.

A method for increasing authentication and security using multiple biometrics is provided. The method may include storing two or more encrypted biometric attributes of a user in a centralized database. In an embodiment the database may be distributed.

The method may include receiving a request to authenticate the user at an authentication engine. The request may include various details and contents. The authentication engine may be located on a central or distributed server, or it may be at a location remote from the server. The method may include the authentication engine determining, through a content and contextual analysis, which biometric sensor(s) to use to authenticate the user. Context may be gleaned from various sources.

The method may include the engine prompting the user to use whichever biometric sensor(s) the engine has determined is contextually appropriate to measure biometric attribute(s) of the user, and then measuring those biometric attribute(s) corresponding to the chosen biometric sensor(s). The method may also include temporarily storing the measured biometric attributes of the user and communicating with the centralized database storing the previously measured biometric attributes of the user.

The method may include comparing the currently measured biometric attributes of the user to the stored biometric attributes. If the attributes match, the engine may authenticate the user. If they do not match, the engine may deny authentication to the user. The method may include deleting the currently measured biometric attributes of the user. In an embodiment, the currently measured biometric attributes are not deleted; rather they may be encrypted and stored for later use and analysis, or as a record.

In an embodiment, method may include using two different biometric sensors to measure different biometric attributes of the user. Multiple different biometric sensors and attributes may increase security and authentication. If one biometric attribute is good, two may be better in certain situations, even at the cost of increased computing power and memory, and increased time.

In an embodiment, the method may include converting any analog biometric sensor data to digital data to facilitate computer analysis and storage.

In an embodiment, the request for authentication of the user may require multiple biometric attributes to be measured. For example, a request may require both a facial recognition scan and a fingerprint scan, or any other measurable biometric attribute. Alternatively, the request may simply require multiple biometric attributes without specifying a specific type. If the request requires multiple biometric attributes to be measured, the engine may determine that multiple biometric sensors should be used, instead of a single biometric sensor. The method may include prompting the user to use the multiple biometric sensors chosen by the engine, measuring multiple biometric attributes, and comparing those measured attributes to stored biometric attributes to authenticate, or deny authentication, to the user.

In an embodiment, the request for authentication may be to authenticate a document. In another embodiment, the request may be to allow access to a separate program, or a physical location. In another embodiment, the request for authentication may be to authenticate a request for an action, such as a withdrawal or transfer of money from one bank account to another.

A method of authenticating a document through multiple biometric attributes is provided. The method may include scanning the document with a mobile device camera belonging to a user. Alternatively, the method may include inputting the document through a different method, and any appropriate method may be used. In an embodiment, the document may include multiple pages, or multiple separate documents.

In an embodiment, the mobile device may be a mobile phone.

The method may include contextually determining, at an authentication engine, which biometric sensor(s) integrated into the mobile device to use to authenticate the user. In an embodiment, the authentication engine may use AI/ML algorithms to analyze the request. In an embodiment, the contextual analysis may include analyzing the contents of the document to be authenticated. Various factors of the contents may inform the authentication engine's analysis and determination on which biometric sensor(s) to use to authenticate the user.

The method may include authenticating the user by measuring biometric attribute(s) of the user with biometric sensors integrated into the mobile phone. The method may include inscribing a digital signature into the document. The digital signature may be created by measuring biometric attribute(s) of the user with biometric sensors integrated into the mobile phone, storing the biometric attribute(s) in non-transitory memory, and generating a digital token of the biometric attribute(s).

In an embodiment, the digital signature may be visible on a version of the document. In another embodiment, the digital signature may be integrated as metadata into the document, without a visual representation.

In an embodiment, each page of the document may require a distinct signature. In an embodiment, each signature may be embedded as a digital signature, each created from a separate and distinct biometric attribute. For example, the first page signature may be formed from a fingerprint, the second page signature from voice recognition, and a third page signature from a facial recognition scan.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
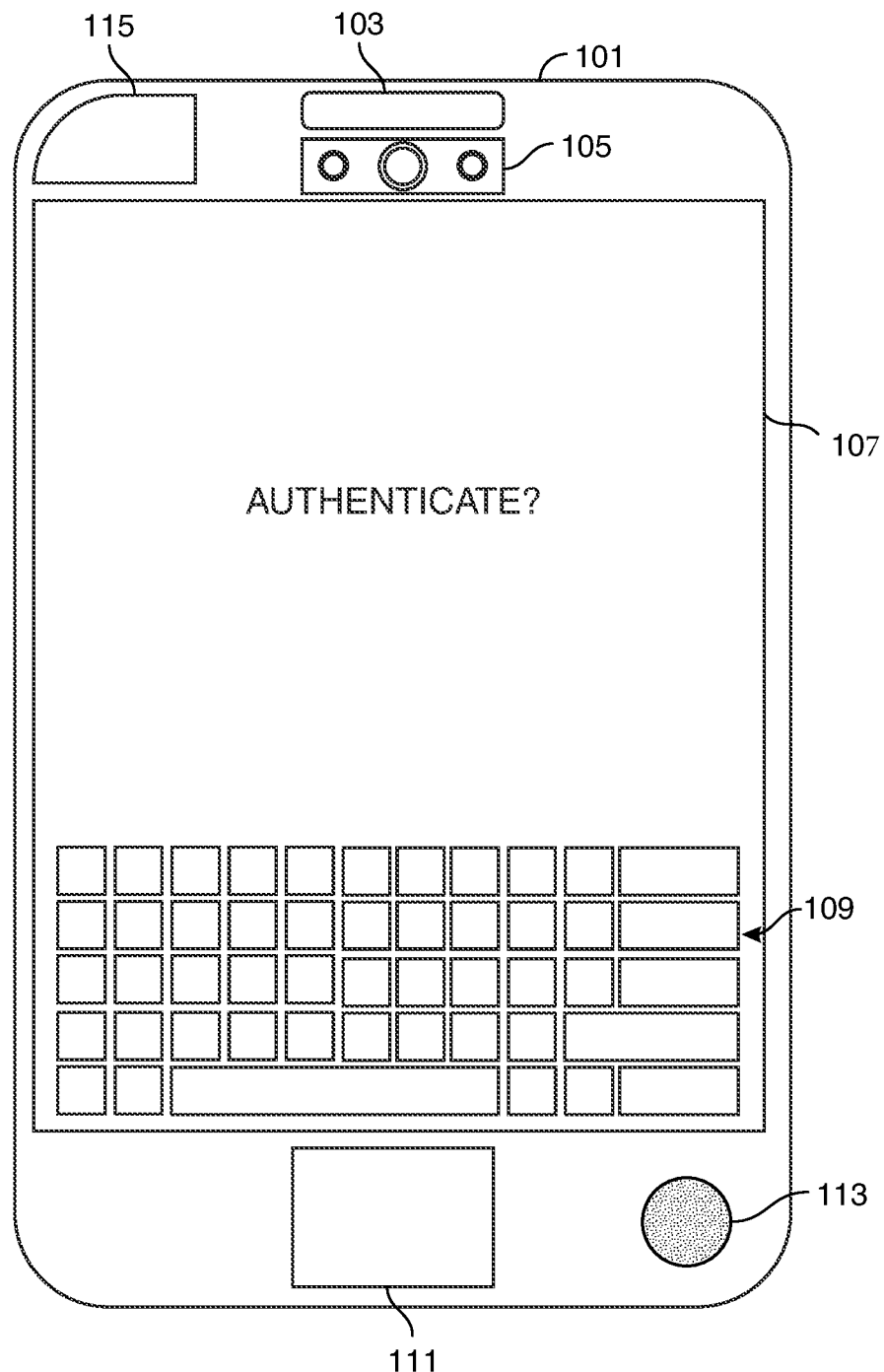
FIG. 1 shows an illustrative system in accordance with principles of the disclosure.

An apparatus for increasing authentication and security using multiple biometrics and contextual analysis is provided. A preferred embodiment may be a mobile device such as a smartphone. Authentication and security may be referred to interchangeably in this disclosure.

The apparatus may include two or more biometric sensors. Each biometric sensor included with the apparatus may measure one or more biometric attributes/indicia of a user. For example, one sensor may measure a fingerprint, while another sensor may measure the user's retina for retinal recognition.

In general, biometric sensors may measure either physical or behavioral attributes of a user. Physical attributes may include, but are not limited to, fingerprints, palm prints, facial recognition, iris scans, retinal scans, DNA, vein/artery patterns, vital signs, finger geometry, ear geometry, body geometry, and dental/tooth attributes. Various sensors may measure one or more of these and other physical attributes through various methods. These, and other attributes, may be referred to as biometric attributes in this disclosure.

Behavioral attributes may include, but are not limited to, a user's walking gait, signature, typing speed, keystroke pressure and typing/writing style, voice recognition, unique gestures, blinking patterns, and other attributes. Various sensors may measure one or more of these and other physical attributes through various methods. These, and other attributes, may also be referred to as biometric attributes in this disclosure.

In an embodiment, each sensor may measure the same biometric attribute(s) of the user. For example, the apparatus may include two fingerprint scanners or two retinal scanners. In another embodiment, each sensor may measure different biometric attribute(s) of the user. For example, one camera for facial recognition and one fingerprint scanner, where each biometric sensor may measure a different and distinct biometric attribute.

In an embodiment, one sensor may measure multiple biometric attributes of a user. This sensor may be referred to as a multi-biometric sensor. For example, a camera may be able to perform a facial recognition scan as well as measure a user's gait and other bodily features (e.g., hand size measurements, body size measurements) unique to an individual.

The apparatus may include one or more analog to digital signal converters that may convert analog signals (i.e., analog versions of biometric attributes) measured by each biometric sensor to computer-readable digital data. In an embodiment, a signal converter may not be necessary if the biometric sensor(s) measures digital data directly. In an embodiment, a biometric sensor may measure digital data or convert, within the sensor itself, analog data to digital data.

The apparatus may include one or more computer processors and non-transitory memory electronically coupled to the processor(s). Increases in processing power and memory may increase the power and capabilities of the apparatus. In an embodiment, some or all of the relevant processor(s) and memory may be located remotely from the apparatus, e.g., in the cloud, and the apparatus may use the processing power and memory through a communication link. The communication link may be cellular, Wi-Fi, Bluetooth, or any other suitable communication paradigm.

References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

It will be appreciated that any network connections discussed, shown or not shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with data, to any suitable computer system. The computer-readable instructions may be to store data or instructions in cache memory, the hard drive, secondary memory, or any other suitable memory.

The term "non-transitory memory," as used in this disclosure, is a limitation of the medium itself, i.e., it is a transitory medium and not a signal, as opposed to a limitation on data storage types (e.g., RAM vs. ROM). "Non-transitory memory" may include both RAM and ROM, as well as other types of memory.

The microprocessor may control the operation of the system/remote computer and its components, which may include RAM, ROM, an input/output module, and other memory. The microprocessor may also execute all software running on the remote computer—e.g., the operating system and any applications such as an annotation management system and any security protocols. Other components commonly used for computers, such as EEPROM or Flash memory or any other suitable components, may also be part of the system.

The network connections may include a local area network (LAN) and a wide area network (WAN or the Internet), and may also include other types of networks. When used in a WAN networking environment, the system may include a modem or other means for establishing communications over the WAN or LAN. The modem and/or a LAN interface may connect to a network via an antenna. The antenna may be configured to operate over Bluetooth, WI-Fi, cellular networks, or other suitable frequencies.

Any memory may be comprised of any suitable permanent storage technology—e.g., a hard drive or other non-transitory memory. The memory may store software including an operating system and any application(s) (such as the annotation management system and a web browser) along with any data needed for the operation of the system and to allow annotation of the body of data. The data may also be stored in cache memory, or any other suitable memory. Alternatively, some or all of computer executable instructions (alternatively referred to as "code") may be embodied in hardware or firmware.

An input/output ("I/O") module may include connectivity to a keyboard, monitor, or network interface through which a user, such as an annotator or a checker, of the annotation management system may provide input. The input may include input relating to cursor movement. The input/output module may also include one or more speakers for providing audio output and a video display device, such as an LED screen and/or touchscreen, for providing textual, audio, audiovisual, and/or graphical output.

The memory may include an operating system that runs on/through the processor(s). The processor may be a microprocessor. The memory may also include an authentication engine/program/module that runs on/through the processor(s), as well as other data. The other data may include previously stored biometric attributes of the user for comparison with measured biometric attributes. The authentication engine may be a part of the operating system, or it may be a distinct software application. The operating system and authentication engine may include instructions that may be processed through the processor(s).

The operating system may run the apparatus, including input/output and other functions, in addition to running the authentication engine. In an embodiment, there may be an operating system for the apparatus as a whole, and a secondary operating system to run the authentication engine. For example, if the apparatus is a smartphone, the smartphone may have its own operating system, and a secondary operating system may be a program that includes the authentication engine along with other capabilities.

In an embodiment, the previously stored biometric attributes of the user may be stored in a location remote from the apparatus, such as on a central or distributed server or a central or distributed database. In an embodiment, the previously stored biometric attributes may be generated when the user sets up the system, including choosing passwords, PINs, and other identifying information. In an embodiment, the previously stored biometric attributes may be encrypted to prevent malicious actors from discovering the attributes. In an embodiment, hash values may be assigned to the biometric attributes and only hash values may be compared with each other.

In an embodiment, the apparatus may include a communication circuit or link to communicate with a remote server or database or the Internet. The communication link may be cellular, Wi-Fi, Bluetooth, or any other suitable communication paradigm.

The authentication engine may be arranged/designed to receive a request to authenticate the user. The request may include various details, including who or what it is from, where the request originates, what the request is for, why authentication is needed, how the request may be satisfied, how the request may not be satisfied, minimum requirements, encryption keys, the contents of a document needing authentication, as well as other details. These details may be data or metadata.

The request may come from a separate program, another user, a website, or any other appropriate location. For example, a user may attempt to login to her financial institution accounts. Once that attempt begins, the financial institution may require one or more biometric authenticators in lieu of, or in addition to, standard authenticators such as a password or PIN.

In an embodiment, the request may require multiple authenticators, such as a fingerprint and facial recognition scan. In another embodiment, the request may not specify which one or more biometric attributes is needed, and simply indicated that a biometric authenticator is necessary. The authentication program may activate one of or all of the biometric sensors on the apparatus.

In an embodiment, the request for authentication may be to authenticate a document, such as proving that a particular user has agreed to sign a contract. In an embodiment, the contents of the document may be provided along with the request. In another embodiment, the request may be to allow access to a separate program, or a physical location. In another embodiment, the request for authentication may be to authenticate a request for an action, such as a transfer of money from one bank account to another or a payment directly from a bank account.

The authentication engine may determine, through content and contextual analysis, which one of the biometric sensors would be appropriate to use to authenticate the user. In an embodiment, the engine may determine that two or more biometric sensors may be appropriate to authenticate the user. In an embodiment, the authentication engine may utilize artificial intelligence/machine learning algorithm(s) ("AI/ML") to make its determination(s). Any type of AI/ML algorithm, such as deep forest or neural network, may be appropriate. Training data may be provided by the user or others.

The authentication engine may analyze the request by viewing the contents of the request and viewing the request in context with where, when, and by what/whom the request has been sent. The more data provided in the request, the more accurate the analysis may be. The contents of the request may be sent as metadata and may include some or all of the following: who or what the request is from, where the request originates, what the request is for, why authentication is needed, how the request may be satisfied, how the request may not be satisfied (i.e., what biometrics would be unacceptable to the request originator), minimum requirements, encryption keys, the contents of a document needing authentication, and any other detail that may provide context for the authentication engine to analyze.

For example, if a user is attempting to login to her financial institution through a mobile device such as a smartphone, the engine may determine context through the available sensors on the smartphone. A desktop computer may have different biometric sensors available for use. In another example, if a user is looking at a document on a smartphone and needs to biometrically affix her signature to the document, the engine may determine to use the smartphone's camera for a facial recognition scan. Conversely, choosing to use a dental pattern attribute would not be appropriate in context with the request.

Once the engine has determined which one or more biometric sensors would be appropriate to respond to the received request, it may prompt the user to use the determined sensor(s) to measure one or more biometric attributes of the user. For example, if it determines that a facial recognition scan and/or a fingerprint would be contextually appropriate, it may flash a message on a smartphone screen to prompt the user to use the fingerprint scanner and/or camera. If the user does not follow the prompt(s), the engine may prompt the user again. In an embodiment, the engine may prompt the user a pre-determined number of times (e.g., three) before the authentication attempt will fail.

The engine may then use the chosen sensor(s) to measure the corresponding biometric attributes of the user. If necessary, the engine may use the analog to digital signal converters to convert the measurements to digital data. The authentication engine may store the digital data in non-transitory memory. The data may be stored temporarily. In an embodiment the data may be stored for a longer period of time, so it may be used for research and analysis.

In an embodiment, the digital data may be converted to hash values.

The authentication engine may compare the measured biometric attributes to previously stored biometric attribute(s) to authenticate the user. In an embodiment, the engine may compare hash values instead of the actual data. Hashing may be performed by the engine or another program. The previously stored biometric attributes, or their hash values, may be stored on the apparatus or may be stored in a location remote from the apparatus. If the measured biometric attributes (or their hash values) match the stored biometric attributes (or their hash values, respectively), the engine may authenticate the user. If they do not match, the engine may deny authentication.

In an embodiment, if authentication is denied, a report may be generated. In another embodiment, the report may be transmitted to an administrator as an active security measure.

In various embodiments, a biometric sensors may be a fingerprint scanner, a signature scanner, a palm print scanner, a microphone, an iris/retinal scanner, a camera that measure various body parts including for facial recognition and gait recognition, a DNA scanner, a vital signs monitor, keyboard sensors, gesture recognition scanners, artery/vein scanners, or other types of biometric sensors. Each sensor may work through a different medium (e.g., capacitive touch, temperature, or visual cameras).

In an embodiment, the apparatus may be a mobile device such as a smartphone or tablet. In other embodiments, the apparatus may be part of a fixed installation or a personal computer (such as a desktop or laptop).

A method for increasing authentication and security using multiple biometrics is provided. The method may include storing two or more encrypted biometric attributes of a user in a centralized database. In an embodiment the database may be distributed. Any type of database may be utilized. In an embodiment, only hash values (and any necessary keys) of the biometric attributes may be stored.

The method may include receiving a request to authenticate the user at an authentication engine. For example, a user may desire to login to her bank account through a mobile phone application. Upon opening the application on her phone, the application may send an authentication request to an authentication engine. The authentication engine may be located on a central or distributed server, or it may be at a location remote from the server. The authentication engine may be located at the same location, and even within the same software application, as the request origination (e.g., on a mobile phone).

The method may include the authentication engine determining, through a content and contextual analysis, which biometric sensor(s) to use to authenticate the user. Context may be gleaned from various sources, especially the contents of the request and any data or metadata included with the request for authentication.

In an embodiment, the engine may determine that two or more biometric sensors may be appropriate to authenticate the user. In an embodiment, the authentication engine may utilize artificial intelligence/machine learning algorithm(s) ("AI/ML") to make its determination(s). Any type of AI/ML algorithm may be appropriate. Training data may be provided by the user or others.

The authentication engine may analyze the request by viewing the request in context with where, when, and by what/whom the request has been sent. For example, if a user is attempting to login to her financial institution through a mobile device such as a smartphone, the engine may determine context through the available sensors on the smartphone. A desktop computer may have different biometric sensors available for use. In another example, if a user is looking at a document on a smartphone and needs to biometrically affix her signature to the document, the engine may determine to use the smartphone's camera for a facial recognition scan. In addition, if authentication is required to prove that a user read through a document (for example a user license), facial recognition, iris scanning, or retinal scanning, may be contextually appropriate as proof that the user actually looked at the document. Conversely, choosing to use the user's gait attribute(s) would not be appropriate in context with the request.

The method may include the engine prompting the user to use whichever biometric sensor(s) the engine has determined is content and contextually appropriate to measure biometric attribute(s) of the user, and then measuring those biometric attribute(s) corresponding to the chosen biometric sensor(s). The method may also include temporarily storing the measured biometric attributes of the user and communicating with the centralized database storing the previously measured biometric attributes of the user.

In an embodiment, the biometric attribute(s) may be converted to hash values, and the hash values may be stored instead of, or in addition to, the actual biometric attribute(s).

The method may include comparing the currently measured biometric attributes of the user to the stored biometric attributes. In an embodiment, only hash values may be compared.

If the attributes match, the engine may authenticate the user. If they do not match, the engine may deny authentication to the user. In an embodiment, if authentication is denied, the engine may request the user to try again. In another embodiment, if authentication is denied, a report or alert may be generated and transmitted to an administrator or other security professional. In an embodiment, the alert may be transmitted to the actual user, to alert the user that a malicious actor may be attempting to impersonate the user.

The method may include deleting the currently measured biometric attributes of the user, or the equivalent hash values. In an embodiment, the currently measured biometric attributes (or hash values) are not deleted; rather they may be encrypted and stored for later use and analysis, or as a record. In an embodiment, the biometric attributes (or hash values) may be used as training data for an AI/ML algorithm.

In an embodiment, method may include using two different biometric sensors to measure different biometric attributes of the user. In an embodiment, the method may include using two biometric sensors to measure the same biometric attributes of the user. For example, two distinct retinal scanners or two distinct fingerprint scanners. Multiple, different biometric sensors and attributes may increase security and authentication. If one biometric attribute is good, two may be better in certain situations, even at the cost of increased computing power and memory, and increased time.

In an embodiment, the method may include converting any analog biometric sensor data to digital data to facilitate computer analysis and storage. Some sensors may automatically perform the conversion or have the capability to do so. Other sensors may measure biometric attributes directly into digital data.

In an embodiment, the request for authentication of the user may require multiple biometric attributes to be measured. For example, a request may require both a facial recognition scan and a fingerprint scan, or any other measurable biometric attribute. Alternatively, the request may simply require multiple biometric attributes without specifying a specific type.

If the request requires multiple biometric attributes to be measured, the engine may determine that multiple biometric sensors should be used, instead of a single biometric sensor. The method may include prompting the user to use the multiple biometric sensors chosen by the engine, measuring multiple biometric attributes, and comparing those measured attributes to stored biometric attributes to authenticate, or deny authentication, to the user. The determination may be through a content- and context-based analysis. The analysis may utilize an AI/ML algorithm to review the contents of the request and determine context and which sensor(s) may be appropriate to use in context with the request.

In an embodiment, the request for authentication may be to authenticate a document. In another embodiment, the request may be to allow access to a separate program, or a physical location. In another embodiment, the request for authentication may be to authenticate a request for an action, such as a withdrawal or transfer of money from one bank account to another.

A method of authenticating a document through multiple biometric attributes is provided. The method may include scanning the document with a mobile device camera belonging to a user. For example, if a user is attempting to authenticate a signature on a purchase contract, the user may scan the contract with her mobile phone camera instead of, or in addition to, physically signing the contract.

Alternatively, the method may include inputting the document through a different method, and any appropriate method may be used. For example, the document may be a Tillable form downloaded from the cloud/Internet.

In an embodiment, the document may include multiple pages, or multiple separate documents.

In an embodiment, the mobile device may be a mobile phone, such as a smartphone with a touchscreen.

The method may include contextually determining, at an authentication engine, which biometric sensor(s) integrated into the mobile device to use to authenticate the user. In an embodiment, the authentication engine may use AI/ML algorithms to analyze the request. In an embodiment, the contextual analysis may include analyzing the contents of the document to be authenticated.

Various factors of the contents may inform the authentication engine's analysis and determination on which biometric sensor(s) to use to authenticate the user. The authentication engine may analyze the document by viewing the contents of the document and viewing the document in context with where, when, and by what/whom the document needs to be authenticated. The more data provided, the more accurate the analysis may be. Details may be included as metadata and may include some or all of the following: who or what the document is from, where the document originates, what the document is for, why authentication is needed, how authentication may be satisfied, how authentication may not be satisfied (i.e., what biometrics would be unacceptable to the document originator), minimum requirements, encryption keys, any other contents of the document needing authentication, and any other detail that may provide context for the authentication engine to analyze.

The method may include authenticating the user by measuring biometric attribute(s) of the user with biometric sensors integrated into the mobile device. The method may include inscribing a digital signature into the document. The digital signature may be created by measuring biometric attribute(s) of the user with biometric sensors integrated into the mobile phone, storing the biometric attribute(s) in non-transitory memory, and generating a digital token of the biometric attribute(s).

In an embodiment, the digital signature may be visible on a version of the document. In another embodiment, the digital signature may be integrated as metadata into the document, without a visual representation.

In an embodiment, each page of the document may require a distinct signature. In an embodiment, each signature may be embedded as a digital signature, each created from a separate and distinct biometric attribute. For example, the first page signature may be formed from a fingerprint, the second page signature from voice recognition, and a third page signature from a facial recognition scan.

In an embodiment, which attribute to use for which signature may be determined through a contextual analysis. An authentication engine may analyze the document and request for authentication by viewing the document/request in context with where, when, and by what/whom the request has been sent, and what the document is or requires in terms of authentication. For example, if the document is a user license agreement that requires a single signature or approval, the engine may determine that a facial recognition scan or retinal scan may be most appropriate contextually, as proof the user read the agreement. Alternatively, if the agreement requires multiple signatures/authenticators (e.g., initials on each page, or by certain paragraphs), the engine may determine contextually which biometric attribute to use where to create each digital signature. The engine may utilize one or more AI/ML algorithms to perform the contextual analysis.

In an embodiment and as an example, the authentication engine may contextually determine that a mobile device camera for facial recognition is an appropriate biometric sensor to use to authenticate the user. This determination may be based upon a need to use a facial attribute, i.e., the user's eyes, to actually read the document before signing it. Alternatively, if a retinal or iris scanner is available, those biometric sensors may be more contextually appropriate. If no camera is available, the authentication engine may determine that a fingerprint is the next most contextually appropriate biometric sensor to use, as the user may have to use a finger to scroll through a document or navigate through a document.

In an embodiment, the authentication engine may be modified as appropriate to incorporate user disabilities, so that the engine does not request a biometric signature a particular user cannot provide due to a physical disability. In an embodiment, physical disability and other attributes of the user may be incorporated into the contextual analysis performed by the authentication engine.

In an embodiment and as an example, the authentication engine may contextually determine that a mobile device fingerprint scanner is the appropriate biometric sensor to use to authenticate the user. This determination may be based upon a need to provide a higher level of authenticity than a signature.

In general, a hierarchy of biometric attributes and their authenticity may be the following: 1) highest and most secure: DNA and retinal scans; 2) slightly less secure and authentic: fingerprints, palm prints, and facial recognition; and 3) less secure and authentic: gait analysis, typing speed/style analysis, signature matching, and voiceprints. Standard authenticity markers such as signatures may be less or as secure as those in number 3 above. Other biometric attributes not listed above may fall anywhere from 1 to 3, and their relative security and authenticity may be determined on a case-by-case basis.

In an embodiment, the content and contextual analysis may include analyzing a plurality of: the details of the request for authentication; the available biometric sensors; user preferences; user abilities/disabilities; and other details. The user may be either the requestor (which may be a company or building) or the person that needs to be authenticated. In an embodiment, the user may be considered as both the requestor and the person(s) that need to be authenticated.

The request may include such details, as metadata or other forms of data, as when the request was sent, when it was received, how fast an answer is needed, who or what sent the request, what the request is for, where the request is from, whom or what the request is for, why biometric authenticators are needed, what are acceptable biometric sensors, who the user is that needs to be authenticated, and other details.

The authentication engine may iterate its analysis until it reaches a conclusion to a particular level of confidence. For example, the authentication engine may determine that a particular sensor(s) is appropriate for a given request to a level of more likely than not to be the best available sensor(s) for authentication and security. Alternatively, the level of confidence may be higher (e.g., 75% or 90% or 99.9%). If the engine determines that no appropriate biometric sensor is available it may deny authentication or reject the request.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative apparatus 101 including multiple biometric sensors. Apparatus 101 may take the form factor of a smart phone, with a screen 107, speaker 103, antenna 115, and microphone 113. Other elements, such as a battery, processor, and memory are not shown.

Microphone 113 may be used as a biometric sensor for voice-related biometrics. Screen 107 may include a keyboard 109. Screen 107 may be a touchscreen. In an embodiment, keyboard 109 may be separate from screen 107. Screen 107 and keyboard 109 may also be biometric sensors for various biometric attributes. For example, typing speed, signature recognition, gesture recognition, or other biometric attributes.

Cameras 105 and fingerprint scanner 111 may also be used as biometric sensors. Cameras 105 may have multiple lenses to create different picture types and abilities. For example, multiple lenses may enable three-dimensional pictures which may enable more accurate facial recognition or other body part recognition. Cameras 105 may be used, inter alia, to measure various biometric attributes, such as facial recognition, iris scanning, retinal scanning, and gait measurement. In an embodiment, cameras 105 may include an infrared camera to measure other biometric attributes. Depending on the size of fingerprint scanner 111, it may measure one or more fingers of a user.

Figure 2:
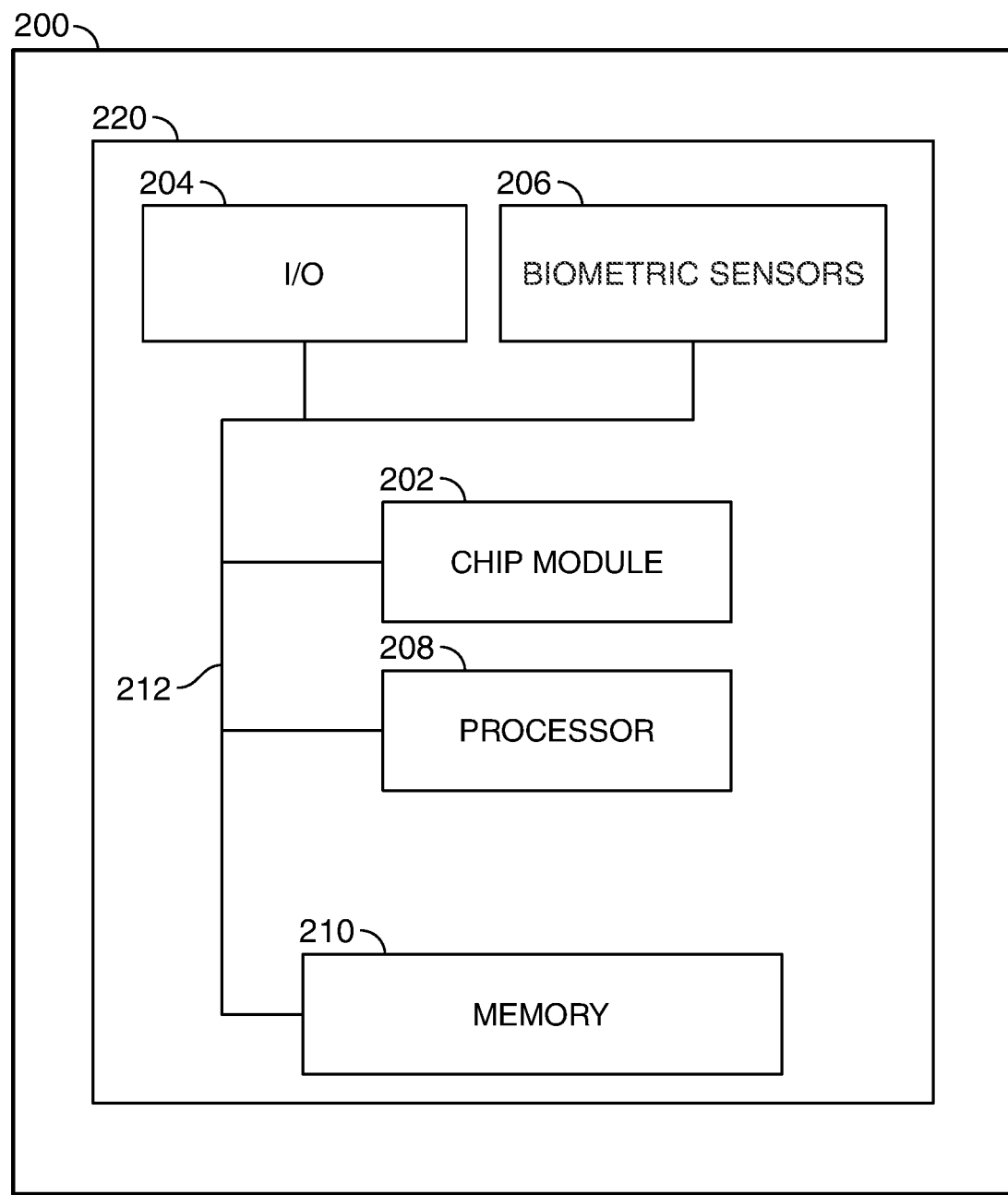
FIG. 2 shows an illustrative system in accordance with principles of the disclosure.

FIG. 2 shows illustrative apparatus 200 that may be configured in accordance with the principles of the disclosure. Apparatus 200 may be a mobile device with various biometric sensors 206. Apparatus 200 may include one or more features of the apparatus shown in FIGS. 1 and 3. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; biometric sensors 206, which may include cameras and fingerprint scanners or any other suitable biometric sensors; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
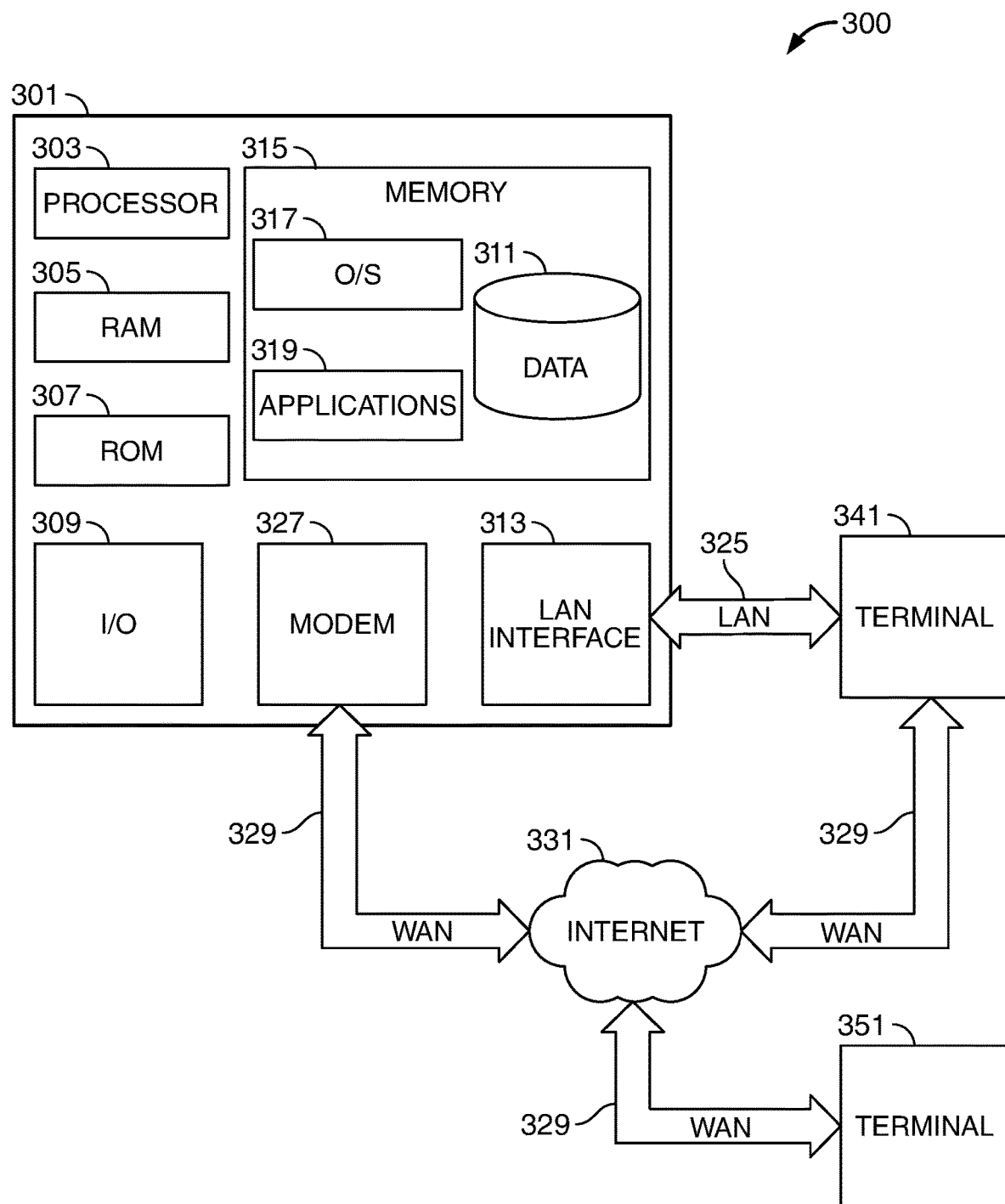
FIG. 3 shows an illustrative system in accordance with principles of the disclosure.

FIG. 3 shows an illustrative block diagram of apparatus 300 that includes a biometric sensor apparatus 301. Biometric sensor apparatus 301 may alternatively be referred to herein as a "computing device." Elements of apparatus 300, including biometric sensor apparatus 301, may be used to implement various aspects of the apparatus and methods disclosed herein. A "user" of apparatus 300 or biometric sensor apparatus 301 may include other computer systems or servers, or a human.

Biometric sensor apparatus 301 may have a microprocessor 303 for controlling the operation of the device and its associated components, and may include RAM 305, ROM 307, input/output module 309, and a memory 315. The microprocessor 303 may also execute all software running on the biometric sensor apparatus 301—e.g., the operating system 317 and applications 319 such as the authorization engine and security protocol. Other components commonly used for computers, such as EEPROM or Flash memory or any other suitable components, may also be part of the biometric sensor apparatus 301.

The memory 315 may be comprised of any suitable permanent storage technology—e.g., a hard drive or other non-transitory memory. The ROM 307 and RAM 305 may be included as all or part of memory 315. The memory 315 may store software including the operating system 317 and application(s) 319 (such as an authorization engine) along with any other data 311 (e.g., biometric attributes or hash values of a user) needed for the operation of the apparatus 300. Memory 315 may also store biometric attributes measured by biometric sensors. The biometric attributes may also be stored in cache memory, or any other suitable memory. Alternatively, some or all of computer executable instructions (alternatively referred to as "code") may be embodied in hardware or firmware (not shown). The microprocessor 303 may execute the instructions embodied by the software and code to perform various functions.

In an embodiment of the biometric sensor apparatus 301, the microprocessor 303 may execute the instructions in all or some of the operating system 317, any applications 319 in the memory 315, any other code necessary to perform the functions in this disclosure, and any other code embodied in hardware or firmware (not shown).

An input/output ("I/O") module 309 may include connectivity to a keyboard, monitor, microphone or network interface through which higher hierarchal server or a user of biometric sensor apparatus 301 may provide input. The input may include input relating to cursor movement. The input/output module 309 may also include one or more speakers for providing audio output and a video display device, such as an LED screen and/or touchscreen, for providing textual, audio, audiovisual, and/or graphical output (not shown). The input and output may be related biometric attribute measurements through the processor 303 or biometric sensors.

Apparatus 300 may be connected to other systems, computers, servers, and/or the Internet 331 via a local area network (LAN) interface 313.

Apparatus 300 may operate in a networked environment supporting connections to one or more remote computers and servers, such as terminals 341 and 351, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 341 and 351 may be personal computers or servers that include many or all of the elements described above relative to apparatus 300. The network connections depicted in FIG. 3 include a local area network (LAN) 325 and a wide area network (WAN) 329 but may also include other networks. Biometric sensor apparatus 301 may include a network interface controller (not shown), which may include a modem 327 and LAN interface or adapter 313, as well as other components and adapters (not shown). When used in a LAN networking environment, biometric sensor apparatus 301 is connected to LAN 325 through a LAN interface or adapter 313. When used in a WAN networking environment, biometric sensor apparatus 301 may include a modem 327 or other means for establishing communications over WAN 329, such as Internet 331. The modem 327 and/or LAN interface 313 may connect to a network via an antenna (not shown). The antenna may be configured to operate over Bluetooth, WI-Fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 319 (which may be alternatively referred to herein as "plugins," "applications," or "apps") may include computer executable instructions for invoking user functionality related to performing various tasks. In an embodiment, application program(s) 319 may be cloud-based applications. In an embodiment, application program(s) 319 may be an authorization engine and a security protocol. The various tasks may be related authenticating a user via biometric sensors and determining which sensor to use through a context-based analysis.

Biometric sensor apparatus 301 may also include various other components, such as a battery (not shown), speaker (not shown), a network interface controller (not shown), and/or antennas (not shown).

Terminal 351 and/or terminal 341 may be portable devices such as a laptop, cell phone, tablet, smartphone, or any other suitable device for receiving, storing, transmitting and/or displaying relevant information. Terminal 351 and/or terminal 341 may be other devices such as remote servers.

Any information described above in connection with data 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 4:
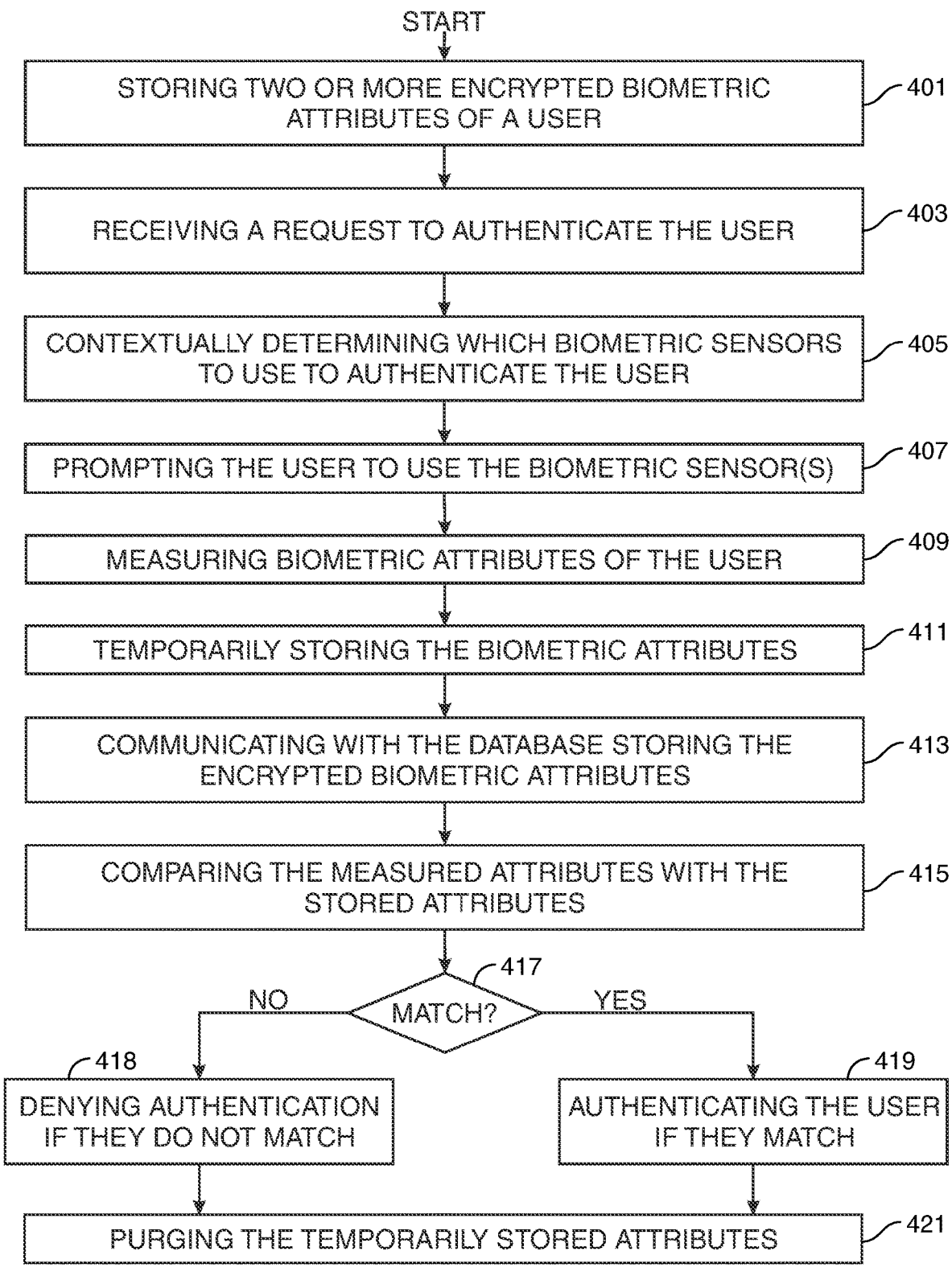
FIG. 4 shows an illustrative flowchart in accordance with principles of the disclosure.

FIG. 4 shows an illustrative flowchart in accordance with principles of the disclosure. Methods may include some or all of the method steps numbered 401 through 421. Methods may include the steps illustrated in FIG. 4 in an order different from the illustrated order. The illustrative method shown in FIG. 4 may include one or more steps performed in other figures or described herein. Steps 401 through 421 may be performed on the apparatus shown in FIGS. 1-3, or other apparatus.

At step 401, two or more biometric attributes of a user may be stored in a central database/server. In an embodiment, the attributes may be encrypted. In an embodiment, hash values in lieu of, or in addition to, biometric attributes may be stored. The central database may be distributed.

At step 403, a request to authenticate the user may be received by an authorization engine/program/application. The authorization engine may be part of the central server/database or may be remote from the central server/database.

At step 405, the authorization engine may analyze the request contextually and determine which biometric sensor(s) to use to authenticate the user. At step 407, the authentication engine may prompt the user to use the biometric sensor(s) it determined in the previous step.

At step 409, biometric attributes of the user may be measured, using the biometric sensor(s) contextually determined as appropriate at step 405. At step 411, the authentication engine may store, temporarily, the measured biometric attributes of the user. In an embodiment, the measured biometric attributes may be stored for a longer period of time.

At step 413, the authentication engine may communicate with the database storing the encrypted, previously stored, biometric attributes of the user. And at step 415, the authentication engine may compare the measured biometric attributes with the stored biometric attributes. In an embodiment, the authentication engine may compare hash values instead of actual attributes.

At step 417, the authentication engine may determine if the measured attributes (or hash values) match the stored attributes (or hash values). At step 418, the authentication engine may deny authentication if they do not match. At step 419, the authentication engine may authenticate the user if they match. In an embodiment, a comparison may be determined to match to a particular degree of confidence, such as e.g., 95%, instead of exactly matching.

At step 421, the authentication engine may purge and delete the measured biometric attributes, whether authentication was granted or denied. In an embodiment, the purging/deletion may occur immediately after grant or denial. In another embodiment, the purging/deletion may occur at some other future time after grant or denial.

Figure 5:
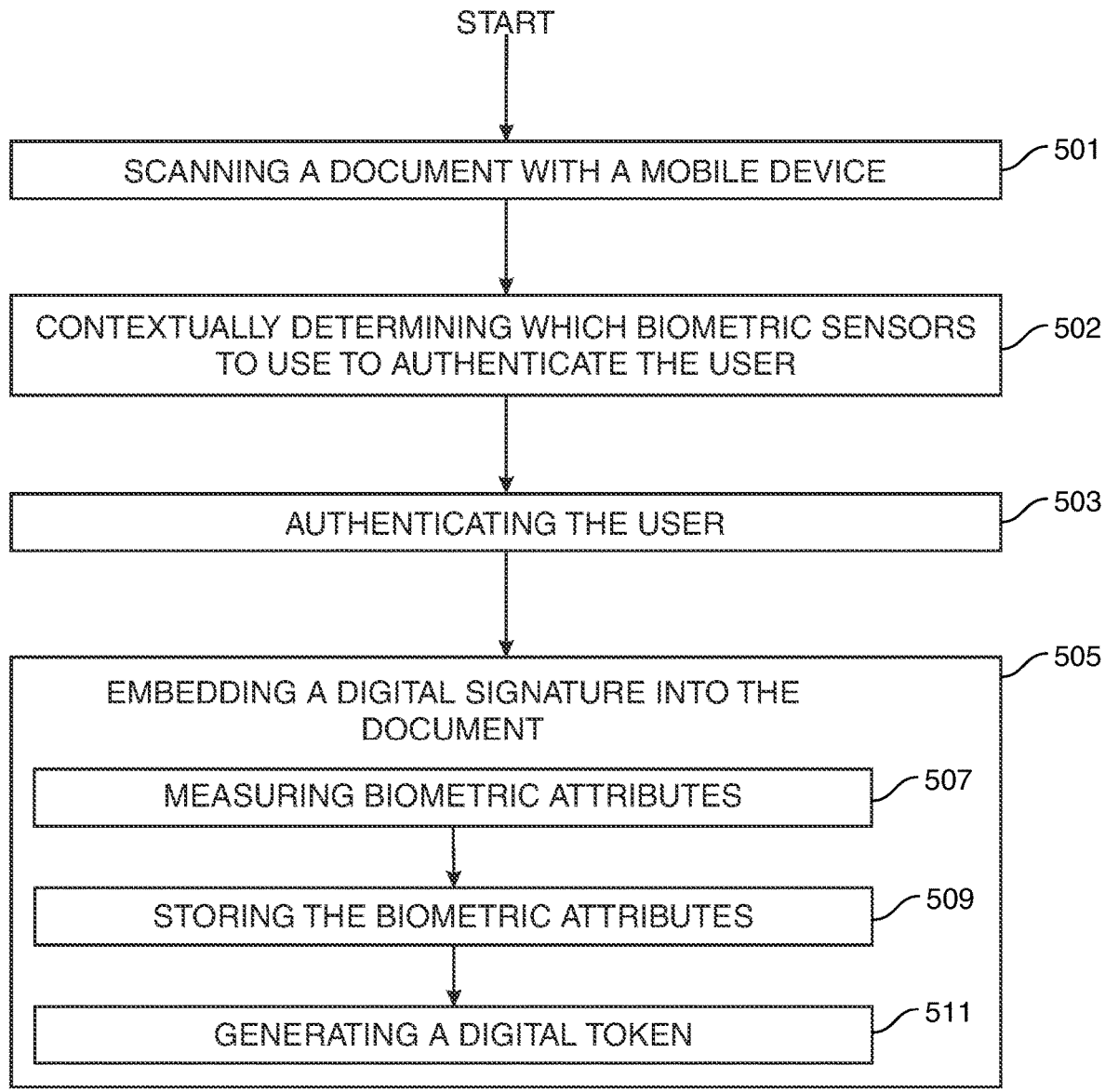
FIG. 5 shows an illustrative flowchart in accordance with principles of the disclosure.

FIG. 5 shows an illustrative flowchart in accordance with principles of the disclosure. Methods may include some or all of the method steps numbered 501 through 511. Methods may include the steps illustrated in FIG. 5 in an order different from the illustrated order. The illustrative method shown in FIG. 5 may include one or more steps performed in other figures or described herein. Steps 501 through 511 may be performed on the apparatus shown in FIGS. 1-3, or other apparatus.

At step 501, a user may scan a document with a mobile device camera belonging to the user. For example, if a user is attempting to authenticate a signature on a purchase contract, the user may scan the contract with her mobile phone camera instead of, or in addition to, physically signing the contract. Alternatively, the user may input the document through a different method, and any appropriate method may be used. For example, the document may be a Tillable form downloaded from the cloud/Internet.

In an embodiment, the document may include multiple pages, or multiple separate documents.

In an embodiment, the mobile device may be a mobile phone, such as a smartphone with a touchscreen.

At step 502, the authorization engine may analyze scanned document contextually and determine which biometric sensor(s) to use to authenticate the user. At step 503, the user may be authenticated by measuring biometric attribute(s) of the user with biometric sensors integrated into the mobile device.

At step 505, which includes sub-steps 507-511, a digital signature may be embedded into the document. The digital signature may be created by measuring biometric attribute(s) of the user with biometric sensors integrated into the mobile device at step 507, storing the biometric attribute(s) in non-transitory memory at step 509, and generating a digital token of the biometric attribute(s) at step 511.

In an embodiment, the digital signature may be visible on a version of the document. In another embodiment, the digital signature may be integrated as metadata into the document, without a visual representation.

In an embodiment, each page of the document may require a distinct signature. In an embodiment, each signature may be embedded as a digital signature, each created from a separate and distinct biometric attribute. For example, the first page signature may be formed from a fingerprint, the second page signature from voice recognition, and a third page signature from a facial recognition scan.

In an embodiment, which attribute to use for which signature may be determined through a contextual analysis. An authentication engine may analyze the document and request for authentication by viewing the document/request in context with where, when, and by what/whom the request has been sent, and what the document is or requires in terms of authentication. For example, if the document is a user license agreement that requires a single signature or approval, the engine may determine that a facial recognition scan or retinal scan may be most appropriate contextually, as proof the user read the agreement. Alternatively, if the agreement requires multiple signatures/authenticators (e.g., initials on each page, or by certain paragraphs), the engine may determine contextually which biometric attribute to use where to create each digital signature. The engine may utilize one or more AI/ML algorithms to perform the contextual analysis.

Thus, apparatus and methods for content-based biometric authentication and using multiple biometrics have been provided. Persons skilled in the art will appreciate that the present invention can be practiced by other than the described embodiments, which are presented for purposes of illustration rather than of limitation.

What is claimed is:

1. A method of authenticating a document using multiple biometric attributes, the method comprising:
scanning the document with a mobile device camera belonging to a user;
contextually determining, through a machine learning algorithm at an authentication engine, which one or more of two or more biometric sensors integrated into the mobile device to use to authenticate the user;
authenticating the user by measuring, with the contextually determined one or more biometric sensors, one or more biometric attributes of the user; and
embedding a digital signature into the document;
wherein the digital signature is formed by:
measuring, with one or more biometric sensors integrated into the mobile device, one or more biometric attributes of the user;

storing the one or more biometric attributes in non-transitory memory; and generating a digital token of the one or more biometric attributes;

wherein the document comprises a plurality of pages;

wherein each page of the document requires a separate digital signature; and wherein each separate digital signature is created from a different biometric attribute.

2. The method of claim 1 wherein the mobile device is a mobile phone.

3. The method of claim 1 wherein the authentication engine contextually determines that a mobile device camera for facial recognition is one of the one or more of two or more biometric sensors to use to authenticate the user, the determination based upon a need to use a facial attribute to read the document before signing it.

4. The method of claim 1 wherein the authentication engine contextually determines that a mobile device fingerprint scanner is one of the one or more of two or more biometric sensors to use to authenticate the user, the determination based upon a need to provide a higher level of authenticity than a signature.

5. The method of claim 1 wherein one of the biometric sensors is a signature scanner.

* * * * *